United States Patent Office 3,435,021
Patented Mar. 25, 1969

3,435,021
COMPOSITIONS OF ANTISTATIC AGENTS AND POLYETHYLENE AND CRACK-FREE ANTISTATIC MOLDED POLYETHYLENE BODIES
Konrad Rombusch and Friedrich Seifert, Marl, Germany, assignors to Chemische Werke Huels A.G., Marl, Germany
No Drawing. Filed Sept. 30, 1966, Ser. No. 583,411
Claims priority, application Germany, Oct. 8, 1965, C 37,094
Int. Cl. C08d 3/04; C09k 3/16
U.S. Cl. 260—94.9                    6 Claims The present invention relates generally to improved compositions of antistatic agents and polyethylene, and particularly to the crack-free antistatic molded polyethylene bodies resulting therefrom.

It is known that plastic moldings, particularly polyethylene, attract dust during storage and use because of electrostatic charging. The electrostatic charging and resulting dust pickup reduces the utility of the molded plastics.

Various means for reducing the static charges on molded plastics have been suggested in the prior art, such as disclosed in Kirk & Othmer, "Encyclopedia of Chemical Technology," 2nd edition (1963), vol. 2, pp. 665–667. In one approach the electrostatic charge has been reduced by coating the surfaces of polyethylene articles with an antistatic composition. Such coating methods have, in most cases, the disadvantage that the antistatic effect is lost when the coating is removed in use or during cleansing of the articles. A more prolonged effect is attained if the antistatic additive is incorporated into the polymeric material, and parts are molded from these compositions. Such composition additives are, for example, quaternary ammonium salts, polyalkylene glycols, and polyalkylene glycol esters. Still better properties have been exhibited, for example, by the oxyethylates of alkanols and alkylaryl phenols, which are disclosed in Belgian Patent 536,623 and British Patent 731,728. These prior art compounds tend to seep out when an amount necessary for sufficient antistatic protection is incorporated into the plastic.

The antistatic properties of plastic articles were further improved by the incorporation of nitrogen-containing compounds. Examples of the nitrogen-containing antistatic agents are amides and aminocarboxylic acid derivatives such as disclosed in French Patents 1,377,803-8, primary and secondary alkylamines such as disclosed in Belgian Patents 655,182, 655,183, and the published disclosures of Netherlands patent applications 6412719 and 6412720, and oxyethylates of alkylamines and fatty acid amides such as disclosed in Belgian Patent 645,800 and French Patents 1,345,827 and 1,322,626.

A particular disadvantage of all the prior art antistatically effective compounds is that they accelerate the formation of cracks in polyethylene moldings in complicated, large-area injection-molded parts. This crack formation is particularly apparent when differing wall thicknesses are present and when there are bends in the material, transitional areas with sharp edges, and various reinforcement ribs. To avoid the cracks, unfavorable processing conditions must be employed. The cracks occur predominantly at the critical points which are subjected to a large amount of stress, and appear in an accelerated manner when the molded parts are stored at elevated temperatures.

It is therefore an object of the present invention to provide molded polyethylene articles having improved antistatic properties.

Other objects of the present invention are improved compositions of antistatic agents and polyethylene.

Still further objects of the invention are the articles molded from antistatic agents and polyethylene having improved resistance to cracks.

Another object of the invention is the selection of an antistatic agent which is compatible with polyethylene.

Upon further study of the specification and claims, other objects and advantages of the present invention will become apparent.

According to the present invention, the new and unexpected results of excellent antistatic effectiveness and high resistance to crack formation have been obtained for moldings and bodies of polyethylene with or without conventional additives, containing 0.1–4% by weight, based on the polyethylene, of salts of the formula:

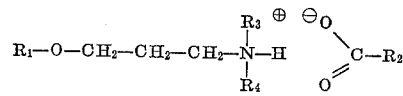

wherein:
$R_1$ represents an alkyl, alkenyl, alkylcycloalkyl, aryl, alkylaryl, or alkenylaryl group of 6–26 carbon atoms in the akyl or alkenyl group;
$R_2$ represents an alkyl, alkenyl, or aryl group of 5–25 carbon atoms in the alkyl or alkenyl group; and
$R_3$ and $R_4$ being identical or different, each represents an alkyl or alkenyl radical of 1–5 carbon atoms and/or a radical $(C_xH_{2x}O)_nH$, $x$ being 2 or 3, and $n$ being 0–15.
The salts are effective alone or mixed with other antistatically effective compounds.

The amine components of the salt have the following formula:

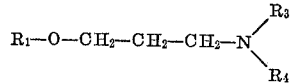

wherein $R_1$ is suitably aryl, or a saturated or unsaturated, straight-chain or branched alkyl, alkylcycloalkyl, or alkylaryl group. With respect to such moieties, aryl is preferably hydrocarbon of 6 to 14 carbon atoms, cycloalkyl is preferably of 4 to 12 carbon atoms, and alkyl is of 6–26, preferably 10–18 carbon atoms. Suitable as group $R_1$ are, for example, the following radicals: phenyl, hexyl, n-octyl, ethyl-hexyl, n-nonyl, i-nonyl, n-dodecyl, n-tetradecyl, i-tetradecyl, hexadecyl, oleyl, n-octadecyl, nonylcyclohexyl, i-nonylphenyl, n-dodecylphenyl, i-dodecylphenyl, n-octadecylphenyl, or mixtures thereof, such as a mixture of $C_{12}$–$C_{18}$ fatty alcohols. The following radicals are preferred: 2-ethyl-hexyl, decyl, undecyl, n-dodecyl, tridecyl, tetradecyl, hexadecyl, and octadecyl.

$R_3$ and $R_4$ are suitably alkyl groups of 1–5 carbon atoms, preferably the methyl and/or ethyl radicals, and/or identical or differing $(C_xH_{2x}O)_nH$ groups, i.e., mono- or polyethylene glycol or propylene glycol radicals wherein $x$ has the value of 2 or 3, preferably 2, and $n$ has the value of 0–15, preferably 0–3; thus, $R_3$ and $R_4$ can also represent hydrogen.

Particular examples of compounds which are suitable amine components of the salt are n-dodecyloxypropylamine, the addition products of 2 mols of ethylene oxide to n-hexyloxypropylamine, of 1 mol of propylene oxide to 2-ethylbutyloxypropylamine, of 20 mols of ethylene oxide to n-decyloxypropylamine, of 6 mols of ethylene oxide to pentaeicosyloxypropylamine, of 13 moles of ethylene oxide to oleylcyclohexyloxypropylamine, of 20 moles of propylene oxide to tetradecyloxypropylamine, of 1 mol of ethylene oxide to a mixture of isomeric, branched dodecyloxypropylamines, of 8 mols of ethylene oxide to a mixture of isomeric, branched trimethylhexyloxypropylamines, of 2 mols of ethylene oxide to tallow-alkyloxypropylamine, of 12 mols of propylene oxide to coconut oil alkyloxypropylamine, of 5 mols of ethylene oxide, to a mixture of $C_{19}$–$C_{25}$ alkyloxypropylamines, 2 mols of ethylene oxide to a mixture of oleyloxy- and stearyloxypropylamines, as well as 2 mols of ethylene oxide to a $C_{10}$–$C_{14}$-alkyloxypropylamine, and furthermore n-dodecyloxypropyl-N,N - dimethylamine, $C_{10}$–$C_{14}$-alkyloxypropylamine-N-ethylamine, $C_{16}$–$C_{18}$ - alkyloxypropyl-N,N - dimethylamine and trimethylhexyloxypropyl-N-methylamine.

These amine compounds are obtained, for example, by the addition of the corresponding hydroxy compounds, such as alkanols, alkenols and alkylphenols to acrylonitrile, by hydrogenation of the cyano group to form the amine and, if desired, by alkoxylation of the amine. A particular method of producing ether amines, such as n-dodecyloxypropylamine, is disclosed in U.S. Patent 3,076,819 and a particular method of reacting amines with ethylene or propylene oxide is disclosed in U.S. Patent 1,970,578.

The alkoxylation depends upon the selection of the substituents $R_3$ and $R_4$.

The oxyethylation or propoxylation leads without catalysts to the addition of 2 mols of the alkylene oxide and there is obtained, for example, the dihydroxyethyl derivative. In the presence of catalytic amounts of alkali, for example in the form of sodium hydroxide, the alkyloxypropylamines absorb 1 to about 500 units of ethylene oxide. Oxyethylates of a narrower molecular weight distribution are obtained when dihydroxyethyl derivatives, obtained without the use of catalysts, are used for the catalytic reaction. The additive is more effective when the desired degree of oxyethylation is obtained by adjusting to a narrower molecular weight distribution. If the mono- or dihydroxyalkyl derivatives or the free amines are not used as the amine component of the salts, the last-mentioned method of operating the process is preferred.

The alkyloxypropyl-N-methyl- and N,N-dimethyl-amines are obtained, for example, by treating the corresponding amines with formaldehyde and formic acid, or by treatment with formaldehyde and hydrogen in the presence of hydrogenation catalysts. Likewise, it is also possible to react oxo-compounds having a higher carbon number, and there are thus obtained the corresponding alkyl derivatives of a higher carbon number.

The carboxylic acid component of the salt has the following formula:

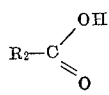

wherein $R_2$ is a saturated or unsaturated, straight-chain or branched alkyl or aryl group of 5–25, preferably 9–17 carbon atoms. Suitable $R_2$ groups are, for example, the following radicals: n-pentyl, n-heptyl, 2-ethylpentyl, n-nonyl, n-undecyl, n-tridecyl, n-pentadecyl, n-heptadecenyl, n-heptadecyl, phenyl and mixtures thereof.

The amine and acid components of the salts are reacted as disclosed in Kirk & Othmer, "Encyclopedia of Chemical Technology," 2nd edition (1963), vol. 2, pp. 72–76. Suitable salts of the present invention contain, for example, the following components: n-dodecyloxypropylamine+2 mols of ethylene oxide and stearic acid, n-octadecyloxypropylamine and lauric acid, coconut oil alkyloxypropylamine and stearic acid, sec.-tetradecyloxypropylamine+2 mols of propylene oxide and caprylic acid, n-dodecyloxypropylamine and behenic acid, n-dodecylphenyloxypropylamine+2 mols of ethylene oxide and caproic acid, $C_{10}$–$C_{14}$-alkyloxypropylamine+2 mols of ethylene oxide and cerotic acid, n-octadecyloxypropylamine+1 mol of ethylene oxide and stearic acid, coconut oil alkyloxypropylamine+20 mols of ethylene oxide and tallow fatty acid, as well as salts from n-octadecyloxypropyldiethylamine and lauric acid, n-dodecyloxypropylbutylamine and lauric acid, tallow fatty alkyloxypropyldimethylamine and stearic acid, and 2-ethylhexyloxypropylmethylamine and myristic acid.

The novel additives are incorporated into the polyethylene in various ways. For example, the polyethylene powder with antistatic agent dispersed therein is transformed into a homogeneous mass in a mixer. For this purpose, any commercially available high speed mixer is generally suitable. It is also possible to prepare a master batch by mixing into the polyethylene a higher percentage of the antistatic agent than is eventually desired, and then by mixing in further polyethylene imparting to the mixture the desired content of antistatic agent. In another embodiment, the antistatic agent is dissolved in a suitable organic solvent, or dispersed, suspended, or emulsified therein, and the solution, dispersion, suspension, or emulsion is added to the polyethylene powder with vigorous stirring. The solvent is then removed by distillation, for example. A solvent well suitable for these purposes is, for example, methanol. However, all other readily distillable solvents are suitable for this purpose. It is also possible to incorporate the antistatic agent into the polyethylene directly on the mill or, for example, directly in the extruder in an injection molding process.

The present invention contemplates the incorporation and homogenization of other conventional antistatic agents and further additives customary in the manufacture of plastics, for example, pigments, stabilizers, mold-release agents, plasticizers, and fillers.

Thus, it is advantageous to add to the polyethylene additionally substances preventing the slight yellow discoloration caused by the antistatic agents being exposed to higher temperatures for prolonged periods. Such stabilizers are, for example, phosphites, particularly didecylphenyl phosphate, triphenyl phosphite, tris-(nonylphenyl) phosphite, tris-(nonylphenol+9 mols ethylene oxide) phosphite, where these compounds are added in amounts of 0.1 to 0.3%. Also the addition of alkylsulfonates, for example, sodium pentadecyl sulfonate is likewise advantageous. For this purpose, about 0.3–1.5% by weight is required.

The antistatic agents are incorporated into the polyethylenes in amounts which range suitably between 0.1 and 4.0% by weight, based on the polyethylene. The amounts preferred are between 0.3 and 1.5% by weight, since with these quantities, a complete protection against dust accumulation by electrostatic attraction is obtained even in very dry and warm air, without impairing the crack resistance of the polyethylene to any nominal extent.

If smaller concentrations are employed, for example, 0.1–0.3%, the protection against electrostatic charging is markedly decreased. Such protection may still be sufficient in cool and moist air, but not in warm and dry air. If concentrations are employed below 0.05%, the antistatic effect and thus the protection against dust accumulation is substantially missing. Higher concentrations than 4% are not necessary, since they do not offer any further improvement.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Examples 1–10

Molded articles prepared from compositions of polyethylene and the antistatic agents of the present invention are compared with the prior art compositions as indicated in the table which follows.

The antistatic behavior of the molded bodies is tested by the ash dust testing method, by measuring the surface resistance according to DIN (German Industry Standard) 53 482–VDE 0303, Part 3, and by determination of the fading of the charge by employing the rotating field strength measuring device according to Schwenkhagen [see M. Bühler, "Textilpraxis" (Textile Practice), 12/11, p. 1147 (1957)]. The measurements are carried out on square molded bodies having a thickness of 1 mm. and an edge length of at least 150 mm.

The ash dust test is conducted in the following manner:

The test plate is rubbed with a cotton cloth and held over crushed cigar or cigarette ashes. The test is designated as positive if the test body rubbed with a cotton cloth does not attract any ash particles at a distance of 0.3 cm. Since the relative humidity of the air strongly influences the electrostatic charges, all measurements—unless expressly stated otherwise—are made at 22° C. and 40% relative humidity. In the examples, presented in tabular form, the test values for the various processing methods are listed. [In the ash dust test, + means no ash attraction, (+) means a minor attraction, (−) means a medium attraction, and − means a strong attraction.]

For producing the salt from the mentioned amines or oxyethylated amines, on the one hand, and fatty acids, on the other hand, an equimolar mixture of the two components is heated until a homogeneous melt is obtained. Upon cooling, the melt solidifies into crystals.

The salt is mixed with the polyethylene as follows:

5 kg. n-dodecyloxypropylammonium laurate are mixed into 95 kg. polyethylene powder in a rapidly rotating mixer. The mixture is granulated in an extruder, and then the resultant granules are injection molded as set forth below.

In order to compare the tendency to form cracks in molded polyethylene bodies provided with antistatic agents according to the present invention, with molded polyethylene bodies having conventional additives, a rectangular type of box (weight 200 g.) was used having the dimensions of 280 × 250 × 40 mm. which is comparable with the numerous packing boxes used in practice. The box has the following features:

(a) differing wall thicknesses at the corners,
(b) sharp-edged transitions, and
(c) varying reinforcement ribs.

The boxes were produced in a screw injection molding machine of the type 260 g-Stübbe, under the following conditions:

Constant conditions:
  Temperature of the
    mass _____ 250–260° C. (This temperature was employed since it is predominantly used in practice.)
  Maximum injection
    pressure _____ 130 atmospheres gauge (manometer indication).

Constant conditions:
  Injection speed _____ 3 seconds.
  Rotational speed of
    the screw _____ 90 r.p.m. (the injection molding process was conducted with the screw turning).
  In the mold _____ 50 seconds.
  Interval _____ 10 seconds.

Variable conditions:
  Post-pressure: 50 atmospheres gauge __ 35 atm. g.
  Post-pressure times, seconds:
    5 _____ 5 seconds.
    8 _____ 8 seconds.
    15 _____ 15 seconds.

The boxes were subsequently stored in a drying chamber at 100° C. and examined with respect to the formation of cracks at particular time intervals. All test results are set out in the appended table.

The table shows an eminently low incidence of crack formation of the molded bodies of the present invention as compared to the molded bodies of the state of the art, the antistatic behavior being equally satisfactory.

TABLE

| Example | Compound (Quantity added 5% relative to the amine component) | After-press. (Atm.) (time 8 seconds) | Low crystalline polyethylene | | High crystalline polyethylene | | Crack formation at 100° C. after periods in hours [2] | | | | | | | | |
|---|---|---|---|---|---|---|---|---|---|---|---|---|---|---|---|
| | | | Surface resistivity at 23° C. and 40% rel. hum. | Ash-test [1] | Surface resistivity at 23° C. and 40% rel. hum. | Ash-test [1] | 1 hr. | 2 hrs. | 3 hrs. | 5 hrs. | 8 hrs. | 10 hrs. | 20 hrs. | 50 hrs. | 100 hrs. |
| 1 | n-Dodecyloxypropyl-ammonium-laurate. | 50 / 35 | $2 \cdot 10^4$ / $9.10^3$–$2 \cdot 10^4$ | + / + | $3 \cdot 10^4$ / $2 \cdot 10^4$ | + / + | | | | | L | L | L | M | ST |
| 2 | N,N-bis-hydroxyethyl-n-dodecyloxypropyl-ammonium laurate. | 50 / 35 | $4$–$5 \cdot 10^3$ / $5 \cdot 10^3$ | + / + | $5$–$6 \cdot 10^3$ / $5 \cdot 10^3$ | + / + | | | | | L / L | L / L | L / L | L / L | M / L |
| 3 | N,N-dimethyl-n-dodecyloxypropyl-ammonium myristate. | 50 / 35 | $2 \cdot 10^4$ / $3 \cdot 10^4$ | + / + | $3 \cdot 10^4$ / $5 \cdot 10^4$ | + / (+) | | | | | L | L | L | M | ST |
| 4 | Salt from C₁₆–C₁₈-alkyloxypropylamine and oleic acid. | 50 / 35 | $2 \cdot 10^4$ / $6 \cdot 10^4$ | + / (+) | $2 \cdot 10^4$ / $5 \cdot 10^4$ | + / (+) | | | | | L | L | L / M | L / M | L / M |
| 5 | Salt from (stearyloxypropyl-amine+8 mol of ethyleneoxide) and coconut fatty acid. | 50 / 35 | $7$–$8 \cdot 10^3$ / $1 \cdot 10^4$ | + / + | $1 \cdot 10^4$ / $2 \cdot 10^4$ | + / + | | | L | L | L / L | L / L | L / L | M / M | ST / M |
| Examples for comparison purposes | | | | | | | | | | | | | | | |
| 6 | n-Dodecyloxypropylamine | 50 / 35 | $1 \cdot 10^4$ / $1$–$2 \cdot 10^4$ | + / + | $1$–$4 \cdot 10^4$ / $2 \cdot 10^4$ | (+) / + | L | L | M | ST | | | | | |
| 7 | N,N-bis-hydroxyethyl-n-dodecyloxypropylamine. | 50 / 35 | $4 \cdot 10^3$ / $3$–$4 \cdot 10^3$ | + / + | $4$–$5 \cdot 10^3$ / $3$–$5 \cdot 10^3$ | + / + | | L | L | L / L | M / L | ST / ST | | | |
| 8 | N,N-dimethyl-n-dodecyloxypropylamine. | 50 / 35 | $5 \cdot 10^4$ / $4 \cdot 10^4$ | (+) / + | $5 \cdot 10^4$ / $2 \cdot 10^4$ | (+) / + | L | L | L / L | M / M | ST / ST | | | | |

[1] += No attraction of cigarette ashes; (+) = Attraction of some cigarette ashes.   [2] L = Slight cracks (approx. .2 to 1 mm. long); M = Medium cracks (approx. 1 to 5 mm. long); ST = Large cracks (more than 5 mm. long).

Aside from Examples 1–7, very good results are obtained with the following amine salts:

N,N-bishydroxyethyl-n-dodecyloxypropyl-ammonium-caprylate,
N,N-bis-hydroxypropyl-iso-nonyloxypropyl-ammonium-behenate,
N-pentyl-n-decyloxypropylammonium-2-ethyl-caproate,
N,N-bis-hydroxyethyl-iso-nonylphenyloxypropyl-ammonium-laurate,
N,N-dimethyl-n-octadecenyloxypropyl-ammonium-caproate,
N,N-bis-hydroxyethyl-n-dodecyloxypropyl-ammonium-caprinate.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An antistatic molding composition comprising polyethylene and about 0.1 to 4% by weight of said polyethylene of an antistatic agent having the following formula:

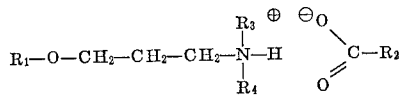

wherein
- $R_1$ is selected from the group consisting of alkyl, alkenyl, alkylcycloalkyl, aryl, alkylaryl, and alkenylaryl groups having 6–26 carbons atoms in the alkyl and alkenyl groups;
- $R_2$ is selected from the group consisting of alkyl, alkenyl, and aryl groups having 5–25 carbon atoms in the alkyl and alkenyl groups; and
- $R_3$ and $R_4$ are selected from the group consisting of alkyl radicals having 1–5 carbon atoms, alkenyl radicals having 1–5 carbon atoms and the radical $(C_xH_{2x}O)_nH$ wherein $x$ is 2 and 3 and $n$ is 0–10.

2. The composition of claim 1, wherein the antistatic agent is about 0.3 to 1.5% by weight of said polyethylene.

3. The composition of claim 2, wherein $R_1$ has 10–18 carbon atoms in the alkyl and alkenyl groups, and $R_2$ has 9–17 carbon atoms in the alkyl and alkenyl groups.

4. The composition of claim 1, further comprising stabilizers and pigments.

5. The composition of claim 1, further comprising a second antistatic agent.

6. The antistatic, crack-free article molded from the composition of claim 1.

References Cited

UNITED STATES PATENTS 2,628,937   2/1953   Paul.
3,205,092   7/1965   Rosenberg.

JOSEPH L. SCHOFER, *Primary Examiner.*

L. EDELMAN, *Assistant Examiner.*

UNITED STATES PATENT OFFICE
CERTIFICATE OF CORRECTION

Patent No. 3,435,021

March 25,

Konrad Rombusch et al.

It is certified that error appears in the above identified patent and that said Letters Patent are hereby corrected as shown below:

Column 4, line 32, "phate" should read -- phite --. Columns 5 and 6, in the Table, heading to first column "Compound (Quantity added 5%" should read -- Compound (Quality added .5% --.

Signed and sealed this 14th day of April 1970.

(SEAL)
Attest:

Edward M. Fletcher, Jr.
Attesting Officer

WILLIAM E. SCHUYLER,
Commissioner of Pate